Patented May 23, 1933

1,910,967

UNITED STATES PATENT OFFICE

WILHELM RUCKDESCHEL, OF BERLIN-WILMERSDORF, GERMANY, ASSIGNOR TO N. V. HANDELSCOMPAGNIE ALHACO, OF AMSTERDAM, NETHERLANDS

MANUFACTURE OF BAKED ARTICLES

No Drawing. Application filed March 12, 1931, Serial No. 522,170, and in Germany August 4, 1930.

Of all the methods used in baking for producing baked articles from leavened dough using yeast as raising medium, the one previously generally used and still used to a considerable extent for making leavened rye bread is the best known; in this method the leavening of the dough is of importance, not only for producing flavour, but also for making a good baking dough from the rye flour, the proteins of which, as distinct from those of wheat flour, are not of themselves adapted to form a paste. The leavening of the dough and the development of the yeast is obtained by this process with a comparatively complicated treatment of the dough, using as raising medium leaven which contains acid bacteria and yeasts. The bacteria and yeasts of the leaven and the bacteria present in the constituents of the dough, more particularly in the flour, produce not only acids and replacement products of pleasant taste, but also in the form of subsidiary fermentations may produce substances of unpleasant taste in the formation of which differences in the composition of the dough, the temperature and other operating conditions take part.

In this method of making leavened rye bread, as well as in all other methods of baking leavened dough in which leaven or cultures of ferments of the leaven serving to replace it or acid bacteria and yeasts in any other form are added from the beginning, the production of the leavening medium and the leavening of the dough take place simultaneously with the development of the yeast and the fermentation; as a result of the lengthy fermentation, losses of material are produced which may reach 5 to 7% of the flour used in making leavened bread.

According to the new method the production of the leavening medium and the leavening of the dough take place in a process which is separated from the yeast fermentation. In the leavening the composition of the culture medium which may consist of a comparatively thin dough or of a nutritive fluid, the fermentation temperature and also the other operating conditions are adapted to the most favourable conditions for the development of acid bacteria and of the flavour; the acid liquid is then used for raising the dough with the addition of suitable yeast and is loosened under favourable fermentation conditions.

The separation of the fermentation of the acid and of the yeast may be obtained in such a manner that in one part of the dough or the liquid containing the nutritive substances the acid fermentation takes place and in another part of the dough the yeast is developed, the acid fermentation being carried so far that the dough mixture made from both parts has the desired degree of acidity. After mixing both parts the dough is loosened under favourable yeast fermentation conditions.

As a rule, however, the acid and yeast fermentations are separated from one another by first a nutritive liquid, for example skim milk, a mixture of flour to which vegetable flour may be added with water or milk, more particularly with skim milk, mashes, worts or a mixture of these nutritive liquids and made to rise and the leavening liquid obtained being used directly or after sterilization for producing yeast dough which can be loosened and then baked under favourable fermentation conditions. If, as initial material for the production of the leaven a mixture of flour with milk, more particularly, skim milk, is used this may be fermented with lactic acid bacteria with addition of diastase containing malted preparations and the mash obtained or the wort obtained by filtration thereof can be used directly or after sterilization for manufacturing leaven.

In general the acid fermentation is allowed to proceed at temperatures of 25 to 40° C. using specific pure cultures of leaven bacteria; it forms an aromatic acid liquid. When special heat resisting bacteria are used the acid fermentation may also take place at higher temperatures up to 50° C. In producing the acid liquid it is not necessary entirely to exclude the presence of yeasts. It is sufficient if the acidification takes place under fermentation conditions which are favourable to the development of the acid bacteria; if this is done yeast autolysate may be added to the nutritive liquid. In this way the excess acid produced during the acid fermentation can be removed by means of calcium carbonate or other substances taking up acid; the calcium salt of the lactic acid produced during fermentation replaces the acid to a certain extent and, if necessary, may be liberated again in the acid liquid by subsequent addition of another suitable acid, for example, phosphoric acid. In this way a concentrated acid liquid is obtained from which the calcium salts produced may be partly or wholly removed.

A modification of the new method consists in this that from the acid liquid obtained by acid fermentation of the nutritive fluid by the addition of flour, more particularly of flour which is rich in swelling starch and by subsequent drying and grinding an acid medium in powder form is obtained which has a definite degree of acidity and is added to the dough in the amount required for the desired degree of acidity of the dough. By the preparation of this acid medium in the form of powder the carrying out of the new process in bakeries is considerably simplified.

In order to avoid undesirable subsidiary fermentations which may arise through the presence, particularly in the flour of wild acid bacteria in the manufacture of the acid liquid from mixtures of flour and milk, more particularly skim milk or water, the fermentation temperature may be varied; preliminary acidification is first carried out at about 32 to 35° C. in which the wild and unsuitable acid bacteria are subdued; then the fermentation temperature is reduced to 24 to 28° C. until the end of the acid fermentation. The acid liquid obtained is made into dough in the manner according to the new method with the addition of flour and yeast and then the dough is loosened and baked in the ordinary way.

As is clear from the foregoing the yeast fermentation proper always takes place at the end of the preparation of the dough. The losses of material which are inevitable in the manufacture of baked articles from leavened dough without separating the acidifications and the yeast fermentation are avoided as far as possible by the new process.

Having now particularly described and ascertained the nature of my said invention I claim:

1. A method of manufacturing baked articles, more particularly rye bread, from leavened dough from flour by using yeast as raising medium, which consists in first using acid fermentation for leavening the dough and then subjecting the leavened dough to yeast fermentation, thereby producing a dough ready for baking, which is worked up in the manner usual for yeast dough.

2. A method according to claim 1, consisting in using for the acid fermentation a nutritive liquid, selected from a group consisting of mash, wort and milk with addition of vegetable flour, thereby obtaining a yeast dough with the acid liquid from the acid fermentation and lastly loosening the yeast dough under favorable fermentation conditions and then baking.

3. A method according to claim 1 consisting in producing an acidifying medium in powder form from the acid liquid obtained by acid fermentation of the nutritive liquid by adding flour, rich in swelling starch, and subsequently adding said acidifying medium to the yeast dough in the amount required for the desired degree of acidity of the dough.

4. A method according to claim 1 in which a dough leavened by acid fermentation and a dough loosened by yeast fermentation are made separately, then mixed and the mixed dough is further worked up in the manner usual for yeast dough.

5. A method according to claim 1, in which a liquid rich in nutritive substance is used for the acid fermentation and by adding yeast, a yeast dough is produced from the acid liquid obtained by acid fermentation.

6. A method according to claim 1, consisting in adding a pure culture of leaven to a nutritive liquid, then subjecting said nutritive liquid to acid fermentation in two temperature steps of which the first step is carried out at a temperature of 32 to 35° C. and the second step at 24 to 28° C., then adding yeast to the leavened dough made from the acid liquid and lastly working up the dough further in the manner usual for yeast dough.

In testimony whereof I have signed my name to this specification.

WILHELM RUCKDESCHEL.